United States Patent [19]

Kray

[11] 4,395,463
[45] Jul. 26, 1983

[54] ARTICLE COMPRISING SILICONE RESIN COATED, METHACRYLATE-PRIMED SUBSTRATE

[75] Inventor: William D. Kray, Burnt Hills, N.Y.

[73] Assignee: General Electric Company, Waterford, N.Y.

[21] Appl. No.: 156,268

[22] Filed: Jun. 3, 1980

[51] Int. Cl.³ .................... B32B 27/36; B32B 27/30
[52] U.S. Cl. .................... 428/447; 427/379; 427/387; 427/385.5; 427/393.5; 427/412.1; 427/412.5; 428/411; 428/522; 428/331; 428/412; 428/451; 428/520
[58] Field of Search .............. 428/447, 411, 412, 520, 428/522, 331, 451; 427/387, 379, 393.5, 385.5, 412.1, 412.5

[56] References Cited

U.S. PATENT DOCUMENTS

| 3,708,225 | 1/1973 | Misch | 351/160 |
|---|---|---|---|
| 3,976,497 | 8/1976 | Clark | 428/447 |
| 3,986,997 | 10/1976 | Clark | 428/412 |
| 4,027,073 | 5/1977 | Clark | 428/447 |
| 4,133,938 | 1/1979 | Bingham | 428/447 |
| 4,147,685 | 4/1979 | Smith | 260/31.2 R |
| 4,159,206 | 6/1979 | Armbruster | 428/447 |
| 4,177,315 | 12/1979 | Ubersax | 428/447 |
| 4,188,451 | 2/1980 | Humphrey | 428/447 |
| 4,224,378 | 9/1980 | Schroeter | 428/447 |
| 4,239,798 | 12/1980 | Schroeter | 428/447 |

Primary Examiner—Ellis P. Robinson
Attorney, Agent, or Firm—Hedman, Casella, Gibson & Costigan

[57] ABSTRACT

Improved air-drying primer compositions for solid substrates adapted for top coating with curable colloidal silica filled thermoset silicone resins comprise an acrylic ester dissolved in a mixture of 2-ethoxyethanol and 4-hydroxy-4-methyl-2-pentanone. In comparison with prior art primer compositions, there is no need for heat and/or ultraviolet curing of the present compositions.

22 Claims, No Drawings

4,395,463

ARTICLE COMPRISING SILICONE RESIN COATED, METHACRYLATE-PRIMED SUBSTRATE

BACKGROUND OF THE INVENTION

This invention relates to substrates covered with a protective coating. More particularly, it relates to improved primers for substrates adapted to receive a silicone resin top coat composition. Curing the top coat with heat forms an adherent protective, abrasion-resistant layer thereon.

Recently, the substitution of glass glazing with transparent materials which do not shatter or are more resistant to shattering than glass, has become widespread. For example, transparent glazing made from synthetic organic polymers is now utilized in public transportation vehicles, such as trains, buses, taxis and airplanes. Lenses, such as for eye glasses and other optical instruments, as well as glazing for large buildings, also employ shatter-resistant transparent plastics. The lighter weight of these plastics in comparison to glass is a further advantage, especially in the transportation industry where the weight of the vehicle is a major factor in its fuel economy.

While transparent plastics provide the major advantage of being more resistant to shattering and lighter than glass, a serious drawback lies in the ease with which these plastics mar and scratch, due to everyday contact with abrasives, such as dust, cleaning equipment and marring results in impaired visibility and poor aesthetics, and oftentimes requires replacement of the glazing or lens or the like.

One of the most promising and widely used transparent plastics for glazing is polycarbonate, such as that known as LEXAN®, sold by General Electric Company. It is a tough material, having high impact strength, high heat deflection temperature, good dimensional stability, as well as being self-extinguishing, and is easily fabricated. Acrylics, such as polymethylmethacrylate, are also widely used transparent plastics for glazing.

Attempts have been made to improve the abrasion resistance of transparent plastics. For example, scratch-resistant coatings formed from mixtures of silica, such as colloidal silica or silica gel, and hydrolyzable silanes in a hydrolysis medium, such as alcohol and water, are known. Misch, U.S. Pat. No. 3,708,225; Clark, U.S. Pat. Nos. 3,986,997, 3,986,497, and 4,027,073; Armbuster et al., U.S. Pat. No. 4,159,206; and Ubersax, U.S. Pat. No. 4,177,315 for example, describe such compositions. Improved such compositions are also described in commonly-assigned copending U.S. application Ser. No. 964,911, filed on Nov. 30, 1978; and in copending U.S. application Ser. No. 82,163, filed Oct. 5, 1979.

The application of silicone hard coat materials to LEXAN® and other thermoplastic materials, e.g., poly(methylmethacrylate) is pre-treatment dependent, i.e., it is good practice, if not essential, to prime the substrate. See, for example, Humphrey, U.S. Pat. No. 4,188,451, which uses as a primer, a UV-cured reaction product of a polyfunctional acrylic ester monomer and a silane containing a silicon-bonded unsaturated hydrocarbon radical, and the abovementioned Ser. No. 82,163, which discloses the use of a thermosetting acrylic resin. It is apparent that the current state of the art in primers requires a stoving (i.e., heating) step or a ultraviolet (uv) radiation step for proper performance. The contents of the abovementioned patents and applications are incorporated herein by reference.

It has now been discovered that thermoplastic acrylates can be laid down as primers by flowing, dipping and the like from a unique solvent system and, after simply air drying for 20–45 minutes, top coating with a thermally curable silica filled silicone will produce ultimately articles having a top layer with excellent adhesion, abrasion resistance and moisture resistance.

SUMMARY OF THE INVENTION

Accordingly, it is one object of the present invention to provide a novel primer for use with a protective coating resin for solid substrates.

Another object of this invention is to provide articles primed with the new composition which, after application of a silicone resin top coat provide improved abrasion-resistant surfaces thereon.

Still another object of the present invention is to provide an improved primer composition coated on a substrate and air dried, especially well suited for top coating with silica sol filled silicone resin compositions.

These and other objects are accomplished herein by providing articles comprising a solid substrate having at least one surface on which is deposited:

(i) a layer of a primer composition; and,
(ii) a layer of a cured top coat containing a colloidal silica filled thermoset organopolysiloxane, said primer composition comprising (a) from about 2 to about 10 parts by weight of a high molecular weight thermoplastic methacrylic ester polymer or copolymer selected from (1) polymers and copolymers comprising $C_1-C_6$ alkyl methacrylate;

(2) copolymers comprising $C_1-C_6$ alkyl methacrylates and a reaction product of glycidyl methacrylate and a hydroxy-benzophenone ultraviolet light screening agent;

(3) copolymers comprising $C_1-C_6$ alkyl metacrylates and (A) a reaction product comprising units of methacrylic acid and $\gamma$-chloropropyltrimethoxysilane (B) acrylic or methacrylic acid, or (C), a mixture of (A) and (B); or (4) a mixture of any of the foregoing;

(b) from about 60 to about 90 parts by weight of 2-ethoxyethanol;

(c) from about 10 to about 30 parts by weight of 4-hydroxy-4-methyl-2-pentanone; and (d) from about 0 to about 20 parts by weight of glacial acetic acid, per 100 parts by weight of (a), (b), (c) and (d) combined.

DETAILED DESCRIPTION OF THE INVENTION

The primer compositions can be applied to a variety of solid substrates by conventional methods, such as flowing, spraying or dipping to form a continuous surface film. Substrates which are especially contemplated herein are transparent, as well as non-transparent, as well as non-transparent plastics and metals. More particularly, the plastics are synthetic organic polymeric substrates such as acrylic polymers like poly(methylmethacrylate), polyesters, such as poly(ethylene terephthalate), poly(butylene terephthalate), etc., polyamides, polyimides, acrylonitrile-styrene copolymers, styrene-acrylonitrile-butadiene copolymers, poly(vinyl chloride), butyrates, polyethylene and the like. The coated substrates especially contemplated are polycarbonates, such as the poly(bisphenol-A carbonates) known as LEXAN ®, sold by General Electric Company, and also injection molded, extruded or cast acrylics, such as poly(methyl methacrylate). Metal substrates for use in the present invention include bright and dull metallized surfaces like sputtered chromium alloys. Other illustrative substrates contemplated herein include wood, painted surfaces, leather, glass, ceramics and textiles.

With respect to the high molecular weight thermoplastic polymers or copolymers to be used in the primer composition, these can be made in known ways and some are commercially available.

The polymers and copolymers of $C_1$-$C_6$ alkyl methacrylate include, for example, poly(methyl methacrylate), poly(n-butyl methacrylate) poly(methyl-co-butyl methacrylate) and the like. These are made by thermal or peroxide or azo-bis-isobutyronitrile catalyzed polymerization of the corresponding monomer, or mixture of monomers in well known bulk, suspension, emulsion, and the like techniques. In general, the molecular weight should be high, that is, at least 50,000, preferably at least 100,000. The upper limit is not particularly critical. A satisfactory range for most purposes is 100,000 to 250,000. A suitable commercial product is poly(methyl methacrylate) type designation Elvacite 2041, sold by DuPont Co.

A second embodiment (a)(2), includes a copolymerized ultraviolet screen in the acrylate primer. Copolymerization of 2,4-dihydroxybenzophenone or other hydroxy-functional benzophenone, e.g., 2,2',4,4'-tetrahydroxybenzophenone with methyl methacrylate is achieved by functionalizing the benzophenone first by refluxing with glycidoxy methacrylate and a catalytic amount of a trialkyl amine. When all of the glycidoxy methacrylate has been consumed, the mixture is reduced in volume to remove the catalyst and methyl methacrylate is added. A preferred final ratio of the methacrylated uv screen to acrylate ester is 1:10, by weight. A suitable catalyst (azobisisobutyronitrile) is added and the solution is heated at 80°–120° C. for two hours. Two more portions of the catalysts are added at two hour intervals. Removal of the solvent gives an acrylate copolymer which is useful herein, alone, or in further admixture with poly(methyl methacrylate) homopolymer, etc.

A third embodiment, (a)(3), includes a copolymerized methacryloxypropyltrimethoxysilane and/or acrylic or methacrylic acid copolymer with a $C_1$-$C_6$ alkyl methacrylate. To make these, a solution of methacryloxypropyltrimethoxysilane 1–10 parts and/or acrylic acid or methacrylic acid 1–10 parts, methyl methacrylate 90–99 parts, a catalyst 1–5 parts, and an appropriate solvent, if desired, e.g., benzene, can be heated at 80° C. for 4 hours. A second portion of catalyst can be added and the solution can be heated for another four hours. The solution can be diluted to 2–10 parts of solids per 100 parts of composition, e.g., with 2-ethoxyethanol and 4-hydroxy-4-methyl-2-pentanone, and, optionally, acetic acid. If desired, also, poly(methyl methacrylate) homopolymer can be added. Heating, to complete solution, can be used. Filtration prior to use is often desirable.

In embodiments (a)(1) and (a)(3), if the substrate material is photolytically unstable, the addition of ultraviolet screening agents to the primer will prolong the life of the substrate and, thus, the final product. Selected uv screens can be added at 0.5 to 50% of the total solids. Illustrative such screening agents are benzophenones, triazoles, hindered amines, salicylate esters, metal complexes, other known screening and/or free radical quenching agents, and the like.

A two to 10 percent solids solution of the primer composition in the solvents combination (all of which are items of commerce) is applied, e.g., by dipping, flowing or spraying, and the primed substrate is air dried, e.g., for 20–30 minutes, e.g., at 15° to 30° C.

The air dried primed substrate is then flow, dip or spray coated with the silica filled curable organopolysiloxane top coat composition.

The curable top coatings used in this invention comprise generally a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, at least 70 weight percent of the silanol being $CH_3Si(OH)_3$, said composition containing 10 to 50 weight percent solids, said solids consisting essentially of 10 to 70 weight percent colloidal silica and 30 to 90 weight percent of the partial condensate. Preferably the composition has a pH of from 7.1 to about 7.8. They are prepared by hydrolyzing a trialkoxysilane or a mixture of trialkoxysilanes by hydrolyzing a trialkoxysilane or a mixture of trialkoxysilanes of the formula $R'Si(OR)_3$, wherein R' is alkyl of from 1 to 3 carbons or aryl, such as phenyl, and R is alkyl, in an aqueous dispersion of colloidal silica.

In the practice of the present invention, suitable aqueous colloidal silica dispersions generally have a particle size of from 5 to 150 millimicrons in diameter. These silica dispersions are well known in the art and commercially available ones include, for example, those sold under the trademarks of Ludox (DuPont) and Nalcoag (NALCO Chemical Co.). Such colloidal silicas are available as both acidic and basic hydrosols. For the purpose of this invention, wherein the pH of the coating compositions is on the basic side, basic colloidal silica sols are preferred. However, acidic colloidal silicas, wherein the pH is adjusted to a basic level, are also contemplated. In addition, it has been found that colloidal silicas having a low alkali content (e.g., $Na_2O$) yield a more stable coating composition. Thus, colloidal silicas having an alkali content of less than 0.35% (calculated as $Na_2O$) have been found to be preferable. Moreover, colloidal silicas having average particle size of from 10 to 30 millimicrons are also preferred. A particularly preferred aqueous colloidal silica dispersion for the purposes herein is known as Ludox LS, sold by DuPont Company.

To make the top coat, the aqueous colloidal silica dispersion is added to a solution of a small amount of alkyltriacetoxysilane in alkyltrialkoxysilane or aryltrialkoxysilane. For the purposes herein, from about 0.07 parts by weight, to about 0.1 parts by weight, based on 100 parts by weight of the total composition of the alkyltriacetoxysilane is used. The temperature of the reaction mixture is maintained at about 20° C. to about 40° C., preferably 20° C., to about 30° C., and most preferably below 25° C. It has been found that in about six to eight hours sufficient trialkoxysilane has hydrolyzed so as to reduce the initial two phase liquid mixture to one liquid phase in which the now treated silica (i.e., treated by its admixture with the alkyltrialkoxysilane or aryltrialkoxysilane) is dispersed. In general, the hydrolysis reaction is allowed to continue for a total of about 12 to 48 hours, depending upon the desired viscosity of the final product. The more time the hydrolysis reaction is permitted to continue, the higher will be the viscosity of the product. After the hydrolysis has been completed to the desired extent, the solids content is adjusted by the additional of alcohol, preferably isopropanol or isobutanol to the reaction mixture. Other alcohols which are suitable dilution solvents include lower aliphatic alcohols, such as methanol, ethanol, propanol, n-butyl alcohol and t-butyl alcohol. Mixtures of such alcohols can be used, too. The solvent system should contain from about 20 to 75 weight percent alcohol to ensure solubility of the partial condensate(siloxanol). Optionally, additional water-miscible polar solvents, such as acetone, butyl cellosolve and the like in minor amounts, like no more than 20 weight percent of the co-solvent system can also be used. The solids content of the top coating composition is generally preferred to be in the range of from about 10 to 25%, most preferably, about 13 to about 20% by weight of the total composition. The pH of the resultant coating compositions of the invention is in the range of from about 3.5 to about 8.0, preferably from about 7.1 to about 7.8, especially preferably higher than 7.2, such as from 7.3 to about 7.5. If necessary, dilute base, such as ammonium hydroxide, or weak acid, such as acetic acid, can be added to the top coating composition to adjust the final pH to this desired range. At these basic pH's the compositions are translucent liquids which are stable at room temperature for at least several weeks. When stored at temperatures below about 5° C. (40° F.) the period of stability is increased even further.

The alkyltriacetoxysilane is used to buffer the basicity of the initial two liquid phase reaction mixtures and thereby also temper the hydrolysis rate. While the use of alkyltriacetoxysilane is preferred herein, glacial acetic acid may be used in its place, as well as other acids such as organic acids like propionic, butyric, citric, benzoic, formic, oxalic and the like. Alkyltriacetoxysilanes wherein the alkyl group contains from 1 to 6 carbon atoms can be used, alkyl groups having from 1 to 3 carbon atoms being preferred. Methyltriacetoxysilane is most preferred for the purposes herein.

The silanetriols, $RSi(OH)_3$, hereinbefore mentioned, are formed in situ as a result of the admixture of the corresponding trialkoxysilanes with the aqueous medium, i.e., the aqueous dispersion of colloidal silica. Exemplary trialkoxysilanes are those containing methoxy, ethoxy, isopropoxy and n-butoxy substituents which, upon hydrolysis, generate the silanetriol and further liberate the corresponding alcohol. In this way, at least, a portion of the alcohol content present in the final coating composition is provided. Of course, if a mixture of trialkoxysilanes is employed, as provided for hereinabove, a mixture of different silanetriols, as well as different alcohols, is generated. Upon the generation of the silanetriol or mixtures of silanetriols in the basic aqueous medium, condensation of the hydroxyl substituents to form

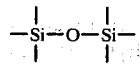

bonding occurs. This condensation takes place over a period of time and is not an exhaustive condensation but rather the siloxane retains an appreciable quantity of silicon-bonded hydroxyl groups which render the polymer soluble in the alcohol-water cosolvent. This soluble partial condensate can be characterized as a siloxanol polymer having at least one silicon-bonded hydroxyl group per every three

units.

The non-volatile solids portion of the top coating composition herein is a mixture of colloidal silica and the partial condensate (or siloxanol) of a silanol. The major portion or all of the partial condensate or siloxanol is obtained from the condensation of $CH_3Si(OH)_3$ and, depending upon the input of ingredients to the hydrolysis reaction, minor portions of partial condensate can be obtained, for example, from the condensation of $CH_3Si(OH)_3$ with $C_2H_5Si(OH)_3$ or $C_3H_7Si(OH)_3$; $CH_3Si(OH)_3$ with $C_6H_5Si(OH)_3$, or even mixtures of the foregoing. For optimum results in the cured coating it is preferred to use all methyltrimethoxysilane (thus generating all monomethylsilanetriol) in preparing the coating compositions herein. In the preferred top coating compositions herein the partial condensate is present in an amount of from about 55 to 75 weight percent of the total solids in a solvent of alcohol and water, the alcohol comprising from about 50% to 95% by weight of the cosolvent.

At low solids content, such as about 13%, it has been found that the polysiloxane polyether copolymers disclosed in copending application Ser. No. 964,911, filed Nov. 30, 1978, now U.S. Pat. No. 4,277,287 incorporated herein by reference, may be employed in the top coating compositions of this invention as flow control additives which assist in the prevention of flowmarks, dirtmarks and the like on the surface of the substrate which is coated. Generally, these polysiloxane polyether copolymers may be employed in amounts of from about 2.5 to about 15% by weight of the total solids of the composition.

The coating compositions of this invention will cure on a substrate at temperatures of, for example, 120° C. without the aid of an added curing catalyst. However, in general, catalyst in the amounts of from about 0.05 to about 0.5 weight percent, preferably about 0.1 weight percent, of the composition can be used. Compositions containing catalysts in these amounts can be cured on a solid substrate in a relatively short time at temperatures in the range of from about 75° C.–150° C. to provide a transparent abrasion resistant surface coating.

By choice of the proper formulation, application conditions and pretreatment of the substrate, the top coatings can be adhered to substantially all primed solid substrates. A hard coating having all of the aforementioned characteristics and advantages is obtained by the removal of the solvent and volatile materials. The top coating composition will air-dry to a tack-free condition, but heating in the range of 75° C. to 200° C. is necessary to obtain condensation of residual silanols in the partial condensate. This final cure results in the formation of silsesquioxane $(RSiO_{3/2})$. In the finished cured top coating the ratio of $RSiO_{3/2}$ units to $SiO_2$ will range from about 0.43 to about 9.0, preferably 1 to 3. A cured top coating having a ratio of $RSiO_{3/2}$ to $SiO_2$, where R is methyl, of 2 is most preferred. Coating thicknesses may vary but for the improved abrasion resistance desired herein, coating thicknesses of 3–10 microns, preferably 5 microns, are utilized.

In order that those skilled in the art may better understand how to practice the present invention, the following examples are given by way of illustration and not by way of limitation.

EXAMPLE 1

A top coating composition is prepared by adding 80.1 lbs. of Ludox LS (aqueous colloidal silica dispersion, average particle size of 12 millimicrons, pH 8.2 sold by DuPont) over a period of one-half hour, to a solution of 135 g. of methyltriacetoxysilane in 97.6 lbs. of methyltrimethoxysilane. The temperature of the reaction mixture is maintained between 20° C. and 30° C. The hydrolysis is allowed to proceed over a period of sixteen hours. At this time the reaction mixture is diluted with 182 lbs. of isopropanol. The pH is 7.4; the viscosity is 5.3 centistokes using a calibrated Cannon-Fenske routine type viscometer.

A primer composition is prepared by charging a clean vessel with 76.0 parts by weight of 2-ethoxyethanol, also known as ethylene glycolmonoethylether. To the agitated solution is added 4.0 parts of poly(methyl methacrylate), ELVACITE 2041, MW 250,000. The mixture is heated to 100° C. and agitation is continued for two hours. The solution is cooled to about 30° C., and 20.0 parts of 4-hydroxy-4-methyl-2-pentanone, also known as diacetone alcohol, is added. The solids content is 3.8–4.2%; the product is filtered and is ready for use.

Pieces of transparent LEXAN ® poly(bisphenol-A carbonate are primed with the acrylic composition by flow coating or dip coating at four inches per minute and allowed to air dry at 20° C. for 20–30 minutes. The primer coating thickness is from 1.5 to 5 micron, respectively, the primed substrates are next dip coated in the top coat composition at two and four inches per minute, allowed to dry for one-half hour and cured one hour at 120° C. The cured coatings are hard, adherent, resistant to moisture and optically clear.

Other acrylates may be used in the primer composition such as poly(n-butyl methacrylate); and selected ultraviolet screening agents or mixtures thereof can also be dissolved in the primer composition.

EXAMPLE 2

The procedure of Example 1 is repeated substituting another primer composition according to this invention.

A solution of 1 mole of 2,4-dihydroxybenzophenone (UVINUL 400) and 1 mole of glycidoxy methacrylate and a catalytic amount of a trialkylamine is refluxed until reaction is complete. The solution is reduced in volume to remove the catalyst and sufficient methylmethacrylate is added to provide 10 parts by weight per 1 part by weight of reaction product. A catalytic amount of azobisisobutylnitrile is added and the solution is heated at 80°–120° C. for 2 hours; two more portions of catalyst are added at two hour intervals. The solvent is removed and the polymer is dissolved in 60–90% of 2-ethoxyethanol. The final primer solution is made by adding 10–50% of poly(methyl methacrylate), 10–30% of 4-hydroxy-4-methyl-2-pentanone and 5–20% of glacial acetic acid. A 2 to 6 percent solids solution is used to prime LEXAN by dipping or flowing, and it is air dried at about 18° C. for about 20–30 minutes. The air dried primed substrate is then flow or dip coated with a silicone hard coat resin as described in Example 1. A hard, transparent, top coated article is obtained. The primer in this instance incorporates a copolymerized ultraviolet light screen. Copolymerization of the screening material appears to immobilize it, preventing its leaching or diffusion.

EXAMPLE 3

The procedure of Example 1 is repeated substituting another primer composition according to this invention.

A solution of methacryloxytrimethoxysilane, 5 parts, methyl methacrylate, 95 parts, and AIBN catalyst, 2.5 parts, and 2-ethoxyethanol solvent, 200 parts, is heated at 80° C. for 4 hours. A second portion of catalyst is added and the solution is heated for another 4 hours. The solution is diluted with 1500–3800 parts of 2-ethoxyethanol and 360–960 parts of 4-hydroxy-4-methyl-2-pentanone to 2–5% solids. Then 100 parts of poly(methyl methacrylate) is added and the composition is heated to complete solution and then filtered prior to use as a primer.

If the procedure is repeated substituting 5 parts of acrylic acid or 5 parts of methacrylic acid for the methacryloxytrimethoxysilane, two other primer compositions for use according to this invention will be obtained.

Obviously, other modifications and variations of the present invention are possible in the light of the above teachings. For example, additives and other modifying agents, such as pigments, dyes, flow control agents, thickness, and the like, may be added to the compositions of this invention. It is to be understood, however, that changes may be made in the particular embodiments described above which are within the full intended scope of the invention as defined in the appended claims.

I claim:

1. An article comprising a solid substrate having at least one surface on which is deposited:
   (i) a layer of a primer composition; and,
   (ii) a layer of a cured top coat containing a colloidal silica filled thermoset organopolysiloxane, said primer composition comprising
   (a) from about 2 to about 10 parts by weight of a high molecular weight thermoplastic methacrylic ester polymer or copolymer selected from
      (1) polymers and copolymers comprising $C_1$–$C_6$ alkyl methacrylate;
      (2) copolymers comprising $C_1$–$C_6$ alkyl methacrylates and a reaction product of glycidyl methacrylate and a hydroxy-benzophenone ultraviolet light screening agent;
      (3) copolymers comprising $C_1$–$C_6$ alkyl methacrylates and (A) a reaction product comprising units of methacrylic acid and γ-chloropropyltrimethoxysilane (B) acrylic or methacrylic acid, or (C), a mixture of (A) and (B); or
      (4) a mixture of any of the foregoing;
   (b) from about 60 to about 90 parts by weight of 2-ethoxyethanol;
   (c) from about 10 to about 30 parts by weight of 4-hydroxy-4-methyl-2-pentanone; and
   (d) from about 0 to about 20 parts by weight of glacial acetic acid, per 100 parts by weight of (a), (b), (c) and (d) combined.

2. An article as defined in claim 1 wherein the solid substrate is comprised of a synthetic organic polymer.

3. An article as defined in claim 2 wherein said polymer is a transparent polymer.

4. An article as defined in claim 3 wherein said polymer is a polycarbonate.

5. An article as defined in claim 4 wherein said polycarbonate is transparent.

6. An article as defined in claim 4 wherein said polycarbonate is a poly(bisphenol-A carbonate).

7. An article as defined in claim 2 wherein said polymer is a polymethylmethacrylate.

8. An article as defined in claim 7 wherein said polymethylmethacrylate is transparent.

9. An article as defined in claim 1 wherein component (a)(1) comprises poly(methyl methacrylate).

10. An article as defined in claim 9 wherein said poly(methyl methacrylate) has a molecular weight in the range of 100,000 to 250,000.

11. An article as defined in claim 1 wherein component (a)(4) is a mixture of poly(methyl methacrylate) and a copolymer of methyl methacrylate and the reaction product of the glycidyl ether of methacrylic acid and 2,4-dihydroxybenzophenone.

12. An article as defined in claim 11 wherein the ratio of methyl methacrylate to reaction product in the copolymer is about 10:1, by weight.

13. An article as defined in claim 1 wherein component (a)(4) is a mixture of poly(methyl methacrylate) and a copolymer of methacryloxypropyltrimethoxysilane and methyl methacrylate.

14. An article as defined in claim 1 wherein the top coat (ii) is an aqueous coating composition comprising a dispersion of colloidal silica in an aliphatic alcohol-water solution of the partial condensate of a silanol of the formula $RSi(OH)_3$, wherein R is selected from the group consisting of alkyl having 1 to 3 carbon atoms and aryl, at least 70 weight percent of the silsilanol being $[CH_2Si(OH)_3]$ $CH_3Si(OH)_3$, said composition containing 10 to 50 weight percent solids consisting essentially 10 to 70 weight percent colloidal silica and 30 to 90 weight percent of the partial condensate.

15. An article as defined in claim 14, wherein in top coat composition (ii) the aliphatic alcohol is a mixture of 20–30% methanol 20–50% isobutanol and 0–25% diethyleneglycol monoacetate.

16. An article as defined in claim 14, wherein in top coat composition (ii) said partial condensate is of $CH_3Si(OH)_3$.

17. An article as defined in claim 14, wherein in top coat composition (ii), the pH is 7.1 to about 7.8.

18. A process for producing a coated article which comprises the steps of:
 (i) applying onto at least a surface of a substrate a layer of a primer composition of claim 1:
 (ii) air drying and evaporating the volatile solvents from said primer composition at a temperature of from about 15° to about 30° C.;
 (iii) applying into said air dried primer layer a silica filled curable organopolysiloxane top coat solvent-containing composition;
 (iv) evaporating the volatile solvents from said top coat composition; and
 (v) applying heat to said top coat composition to cure to same.

19. A process as defined in claim 18 wherein the substrate comprises a polycarbonate.

20. A process as defined in claim 19 wherein said polycarbonate is transparent poly(bisphenol-A carbonate).

21. An article comprising a solid transparent substrate having at least one surface on which is deposited:
 (i) a layer of a primer composition; and,
 (ii) a layer of a cured top coat containing a colloidal silica filled thermoset organopolysiloxane, said primer composition comprising
 (a) from about 2 to about 10 parts by weight of a high molecular weight thermoplastic methacrylic ester polymer or copolymer selected from
 (1) polymers and copolymers comprising $C_1$–$C_6$ alkyl methacrylate having a molecular weight in the range of 100,000 to 250,000;
 (2) copolymers comprising $C_1$–$C_6$ alkyl methacrylates having a molecular weight in the range of 100,000 to 250,000 and a reaction product of glycidyl methacrylate and a hydroxy-benzophenone ultraviolet light screening agent;
 (3) copolymers comprising $C_1$–$C_6$ alkyl methacrylates having a molecular weight in the range of 100,000 to 250,000 and (A) a reaction product comprising units of methacrylic acid and γ-chloropropyltrimethoxysilane (b) acrylic or methacrylic acid, or (C), a mixture of (A) and (B); or
 (4) a mixture of any of the foregoing;
 (b) from about 60 to about 90 parts by weight of 2-ethoxyethanol;
 (c) from about 10 to about 30 parts by weight of 4-hydroxy-4-methyl-2-pentanone; and
 (d) from about 0 to about 20 parts by weight of glacial acetic acid, per 100 parts of weight of (a), (b), (c) and (d) combined.

22. A process for producing a coated article which comprises the steps of:
 (i) applying onto at least a surface of a solid transparent substrate a layer of a primer composition, said primer composition comprising
 (a) from about 2 to about 10 parts by weight of a high molecular weight thermoplastic methacrylic ester polymer or copolymer selected from
 (1) polymers and copolymers comprising $C_1$–$C_6$ alkyl methacrylate having a molecular weight in the range of 100,000 to 250,000;
 (2) copolymers comprising $C_1$–$C_6$ alkyl methacrylates having a molecular weight in the range of 100,000 to 250,000 and a reaction product of glycidyl methacrylate and a hydroxy-benzophenone ultraviolet light screening agent;
 (3) copolymers comprising $C_1$–$C_6$ alkyl methacrylates having a molecular weight in the range of 100,000 to 250,000 and (A) a reaction product comprising units of methacrylic acid and γ-chloropropyltrimethoxysilane (B) acrylic or methacrylic acid, or (C), a mixture of (A) and (B); or
 (4) a mixture of any of the foregoing;
 (b) from about 60 to about 90 parts by weight of 2-ethoxyethanol;
 (c) from about 10 to about 30 parts by weight of 4-hydroxy-4-methyl-2-pentanone; and
 (d) from about 0 to about 20 parts by weight of glacial acetic acid, per 100 parts by weight of (a), (b), (c) and (d) combined;
 (ii) air drying and evaporating the volatile solvents from said primer composition at a temperature of from about 15° to about 30° C.;
 (iii) applying into said air dried primer layer a silica filled curable organopolysiloxane top coat solvent-containing composition;
 (iv) evaporating the volatile solvents from said top coat composition; and
 (v) applying heat to said top coat composition to cure to same.

* * * * *